United States Patent
Modafferi et al.

[19]

[11] Patent Number: 6,059,523
[45] Date of Patent: May 9, 2000

[54] CONTAINMENT SYSTEM FOR CONTAINING BLADE BURST

[75] Inventors: Mario Modafferi, Montreal; Reha Gomuc, Boucherville, both of Canada

[73] Assignee: Pratt & Whitney Canada Inc., Longueuil, Canada

[21] Appl. No.: 09/062,618

[22] Filed: Apr. 20, 1998

[51] Int. Cl.$^7$ ........................................ F01B 25/16
[52] U.S. Cl. .................. 415/9; 415/196; 415/200; 415/173.1; 415/173.4
[58] Field of Search .................. 415/9, 196, 200, 415/173.1, 173.4

[56] References Cited

U.S. PATENT DOCUMENTS

| | | |
|---|---|---|
| 1,698,514 | 1/1929 | Schmidt . |
| 2,372,723 | 4/1945 | Jasper . |
| 3,203,180 | 8/1965 | Price . |
| 3,602,602 | 8/1971 | Motta . |
| 3,887,976 | 6/1975 | Sheilds et al. . |
| 4,149,824 | 4/1979 | Adamson .................. 415/9 |
| 4,377,370 | 3/1983 | Porcelli .................. 415/9 |
| 4,397,608 | 8/1983 | Husain et al. . |
| 4,411,589 | 10/1983 | Joubert et al. .................. 415/9 |
| 4,417,848 | 11/1983 | Dembeck . |
| 4,418,560 | 12/1983 | Pechacek . |
| 4,534,698 | 8/1985 | Tomich .................. 415/9 |
| 4,547,122 | 10/1985 | Leech . |
| 4,639,188 | 1/1987 | Swadley . |
| 4,699,567 | 10/1987 | Stewart . |
| 4,818,176 | 4/1989 | Huether et al. . |
| 4,902,201 | 2/1990 | Neubert . |
| 5,429,477 | 7/1995 | Sikorski et al. . |
| 5,431,532 | 7/1995 | Humke et al. . |
| 5,434,698 | 7/1995 | Takano et al. . |
| 5,486,086 | 1/1996 | Bella et al. . |
| 5,605,441 | 2/1997 | Boszor et al. . |

FOREIGN PATENT DOCUMENTS

| | | |
|---|---|---|
| 1245415 | 9/1971 | United Kingdom . |
| 1466385 | 3/1977 | United Kingdom . |
| 2037900 | 7/1980 | United Kingdom . |
| WO 86/03549 | 6/1986 | WIPO ........................ 415/9 |

*Primary Examiner*—Edward K. Look
*Assistant Examiner*—Matthew T. Shanley
*Attorney, Agent, or Firm*—Jeffrey W. Astle

[57] ABSTRACT

The present invention is addressed to a multiple layer blade burst control system for use in turbine engines. The system utilizes a first inner containment ring and a second outer containment ring separated by a layer of thin ductile material. The inner containment ring and outer containment ring are each mounted to an engine housing by the use of a plurality of supporting legs. The first inner containment ring and the second outer containment ring each have complementary ribs and grooves on their respective inner and outer surfaces, so that when broken blades or blade fragments strike the inner surface of the inner containment ring, this ring absorbs the transfer of energy and moves towards the second containment ring. The movement of the inner containment ring also deforms the thin ductile material which creates an additional energy transfer. The system may also be utilized without the thin ductile layer, and a set of intermeshing protrusions and recesses. The protrusions and recesses may be either complementary or non-complementary. The system has the advantage of being light and easy to manufacture.

24 Claims, 2 Drawing Sheets

CONTAINMENT SYSTEM FOR CONTAINING BLADE BURST

The present invention relates to a cylindrical protection ring for use in turbine engine housings, and in particular, a rotor blade burst protection ring for use in a gas turbine compartment.

DESCRIPTION OF THE PRIOR ART

Protection rings are generally used for externally surrounding or enclosing the rotor areas or fan areas of gas turbine engines used on aircraft. Although modern gas turbine engines can perform for thousands of hours without any significant malfunction, circumstances have arisen where the gear box controlling the drive shaft of the engine decouples from the drive shaft as a result of gear failure. The result of such decoupling is that the drive shaft no longer faces a resistance and begins to continuously increase rotational speed. When the drive reaches a sufficiently high rotational speed, the turbine blade hub can separate from the drive shaft, and be forced radially outward in to the engine housing. To prevent this from occurring, the turbine blades attached to a blade hub may be designed to sever or "burst" from the hub before the hub severs from the drive shaft. However, the severing of such turbine blades can still cause considerable damage. Catastrophic failures of gas turbine blades can cause permanent damage to the engine compartment, as well as significant damage to aircraft fuselage compartments. Various attempts have been made to contain the burst of the fan blades in the engine compartment.

One such attempt is described in U.S. Pat. No. 4,699,567, to Stewart, which discloses a containment ring for a gas turbine engine fan duct. The containment ring comprises a rigid cylinder which is covered on its periphery with layers of fibrous material, consisting of a plurality of pieces of woven material. Further layers of the fibrous material are wrapped or wound around the core layer and then coated with an impervious material.

Another prior art containment ring is disclosed in U.S. Pat. No. 5,163,809, to Akgun et al. In this system, a spirally wound nickel-cobalt containment ring is received within a channel in an engine casing.

Other prior art systems which utilize blade containment structures are disclosed in U.S. Pat. Nos. 4,534,698; 4,818,176; 4,902,201; and 3,602,602. However, the prior art systems disclosed are either difficult to fabricate, relatively high in weight for application on a commercial aircraft engine, or both. Systems which utilize woven or wound fibers for the containment shroud have distinct disadvantages, in that it has been known for gas turbine fan blades to burst through the engine housing and cut through the layers of fibrous material such that the burst is no longer contained within the engine system. Woven fiber containment shrouds are also usually limited to only relatively cold areas of the engine, due to the thermal limitations of the fibers.

SUMMARY OF THE INVENTION

It is therefore a feature of the present invention to provide a containment ring for a gas turbine engine which prevents radially outward moving parts deriving from a failed or broken turbine blade from escaping the surrounding engine casing.

It is another feature of the present invention to provide a containment ring which is relatively light for aerospace applications and easy to manufacture.

It is a further feature of the present invention to provide a containment ring with high energy absorbing characteristics, and which is capable of absorbing the high levels of kinetic energy, and which is capable of being used in hot sections of the engine.

According to a first broad aspect, the present invention provides a containment system for containing blades or fragments of blades resulting from a blade failure, comprising a first inner circumferential containment means and a second outer circumferential containment means surrounding said first inner circumferential containment means; and a circumferential sheet of ductile material separating the first inner circumferential containment means and said second outer circumferential containment means in closely spaced relationship; and mounting means for mounting said first and second circumferential containment means in said closely spaced relationship.

According to a second broad aspect, the present invention provides a cylindrical containment ring, formed by a first inner containment ring adjacent the turbine blade and a second outer containment ring circumferentially surrounding the first inner containment shroud. The first inner containment ring has a plurality of ribs which are configured and arranged to intermesh with a plurality of grooves on the second outer containment ring. The first cylindrical inner containment ring and the second outer cylindrical containment ring are separated by a ductile sheet of metal which absorbs the kinetic energy of a blade burst in the turbine blade compartment. When a turbine blade or blades are subjected to the high centrifugal forces which create a turbine blade burst condition, the movement of the separated turbine blade forces the inner containment ring towards the outer containment ring and absorbs the kinetic energy of the burst. The sheet of ductile material is bent or punctured during this process and thus further absorbs the kinetic energy of the blade burst and damps the movement of the first inner containment ring with respect to the second outer containment ring.

According to a third broad aspect, the invention is addressed to a containment system comprising a first inner circumferential containment means; a second outer circumferential containment means; a set of convex protrusions on one of said first inner containment means and second outer containment means; a set of concave recesses on the other of said first inner containment means and second outer containment means; wherein said convex protrusions and concave recesses intermesh with an interference fit.

In this aspect of the invention, the inner and outer containment rings are not separated by a ductile material, and the concave recesses and convex protrusions will intermesh in a tight interference fit. Since high levels of energy must be expended to force the protrusions into the recesses, the system is capable of absorbing the high levels of energy released during a blade burst.

The use of the containment ring of the present invention also permits weight savings over the conventional prior art single layer containment rings. In addition, the containment ring of the present invention is simpler to manufacture than prior art containment housings utilizing complex fiber windings necessary with the use of KEVLAR, or other types of composite materials known in the art and utilized in such applications. The present invention is also slightly lighter in weight than the previous spirally wound containment rings, such as that disclosed in U.S. Pat. No. 5,163,809 to Akgun et al.

DETAILED DESCRIPTION OF THE INVENTION

Figure 1:
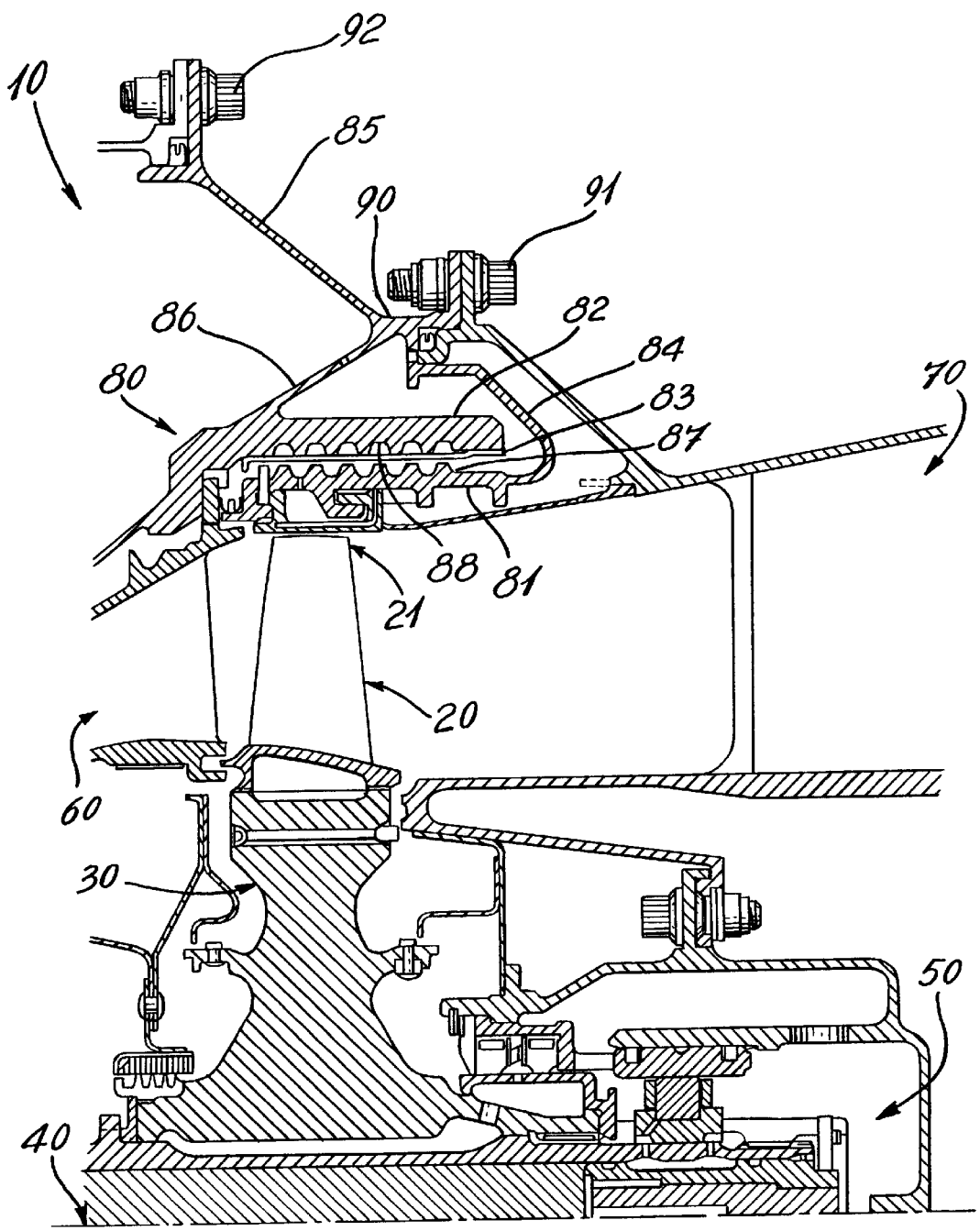
FIG. 1 shows a cross sectional view of a gas turbine engine compartment, including the embodiments of the present invention.

FIG. 1 of the present invention discloses a cross sectional view of an axial flow gas turbine engine 10. The engine includes a plurality of turbine blades 20 connected to respective blade hub 30. Each of the blades 20 is designed to include a slightly weakened portion along the length of the blade airfoil, or at the connection between the blade airfoil 20 and the blade hub (not shown). This design feature is included as a safety feature, and prevents the larger and heavier turbine blade hub from failing before the lighter and thinner blades 20. The blade hub 30 is in turn connected to a central engine drive shaft 40 which provides power to a reduction gear box 50. Forward of the turbine blades 20 are compressor and turbine stages 60, which are composed of a series of blade rows which compress air initially entering the engine duct. Following the turbine blade section 20 is an exhaust duct 70 for exhausting the combustion gases from the combustion section of the gas turbine engine.

Circumferentially surrounding the turbine blades 20 is a cylindrical containment ring generally indicated by the reference numeral 80. The cylindrical containment ring is formed from a first inner containment ring 81, which is circumferentially surrounded by a second outer containment ring 82. The first inner containment ring 81 is formed with a series of ribs 87 extending along an outer surface of the ring. The second outer containment ring 82 is formed with a complementary series of grooves 88 on the inner surface of the ring, and which are designed and arranged to interfit with the ribs 87. Each of the ribs 87 and the grooves 88 may be formed with a tapered configuration, as better shown in FIG. 2.

Other configurations for the ribs and grooves, such as generally convex protrusions and generally concave recesses are within the scope of the present of the present invention. Alternatively, the formation of concave recesses on the inner containment ring and complementary protrusions on the outer containment ring, are also considered to be within the scope of the present invention.

Located between the ribs 87 of the first inner containment ring 81 and the grooves 88 of the outer containment ring 82 is a ductile sheet of material 83 preferably formed from a sheet of metal of approximately 30 to 40 mils thickness. The ductile sheet of material 83 is designed and configured to bend under the high loading forces created when the first inner containment ring absorbs the energy from a burst blade 20.

The first inner containment ring is supported by a mounting means, including a first leg 84, which in cross section, has a generally U-shaped configuration. The second containment ring is supported by a second outer leg 86, which intersects with the first inner leg 84 to define a juncture 90. Extending from the juncture 90 is a third leg 85. The first inner containment ring 81 and the second outer containment ring 82 are supported in position by a plurality of fasteners 91 and 92. The juncture 90 is supported by a first fastener 91, and the peripheral end of the support leg 85 is supported by a second fastener 92. The first fastener 91 and the second fastener 92 are fixed in a static position to the outer engine housing (not shown). Since the first inner ring 81 is designed to deform with respect to the second outer ring 82, the inner ring 81 and the inner leg 84, are thus formed from a material which is generally more ductile than the material forming the outer containment ring 82 and the legs 85 and 86.

Figure 3:
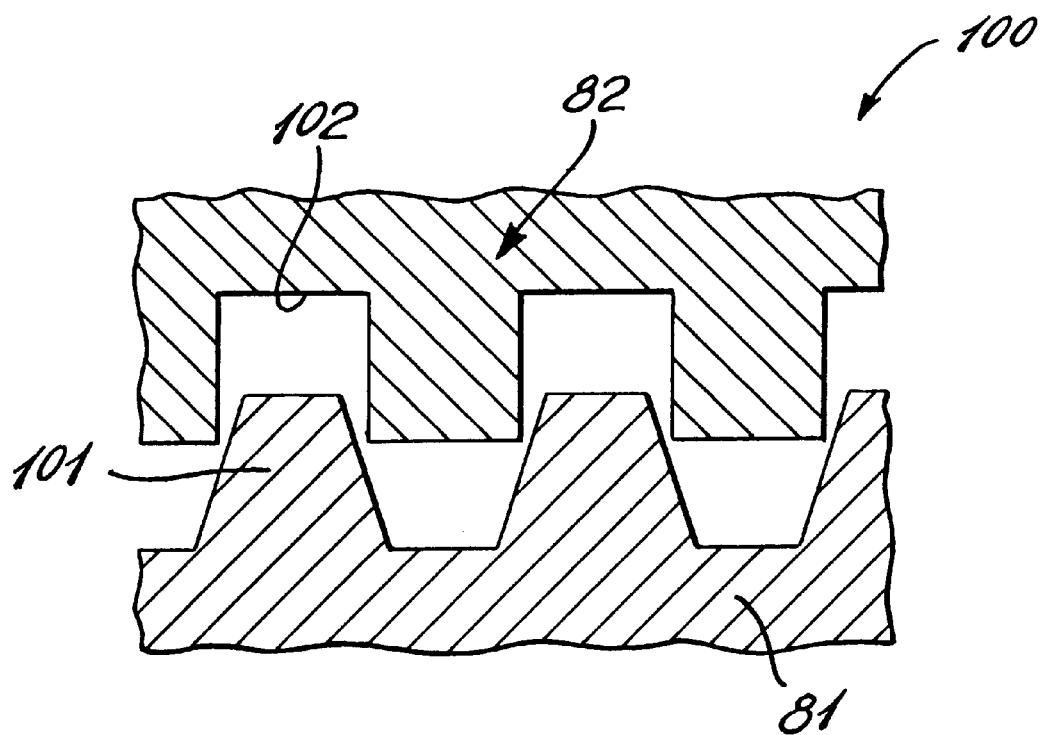
FIG. 3 shows a cross sectional view of an alternate embodiment of the present invention, illustrating convex and concave protrusions intermeshing without an intermediate layer of material between the protrusions.

FIG. 3 illustrates an alternate embodiment of the present invention for a containment ring structure shown generally at 100. The inner containment ring 81 includes a plurality of convex protrusions 101 which interfit with a plurality of concave recesses 102 on the outer containment ring 82. The protrusions and recesses may be formed from a variety of shapes, and may have matching, complementary shapes, or unmatched non-complementary shapes. In the embodiment shown in FIG. 3, the shapes are non-complementary, with the protrusions 101 being generally conical in shape, and the recesses 102 being generally rectangular in shape. Unlike the previous embodiment, this embodiment does not utilize a thin layer of ductile material between the inner and outer containment rings 81, 82. Instead, this embodiment is designed to create a tight interference fit between the protrusions 101 and the recesses 102, when the inner containment ring is deformed outwardly towards the outer ring 82 by a blade burst. Because a tight interference fit requires that a large amount of energy be expended to force the protrusions into the recesses, this design permits the containment ring system to absorb the high levels of kinetic energy released when a failed blade strikes the inner containment ring.

Figure 2:
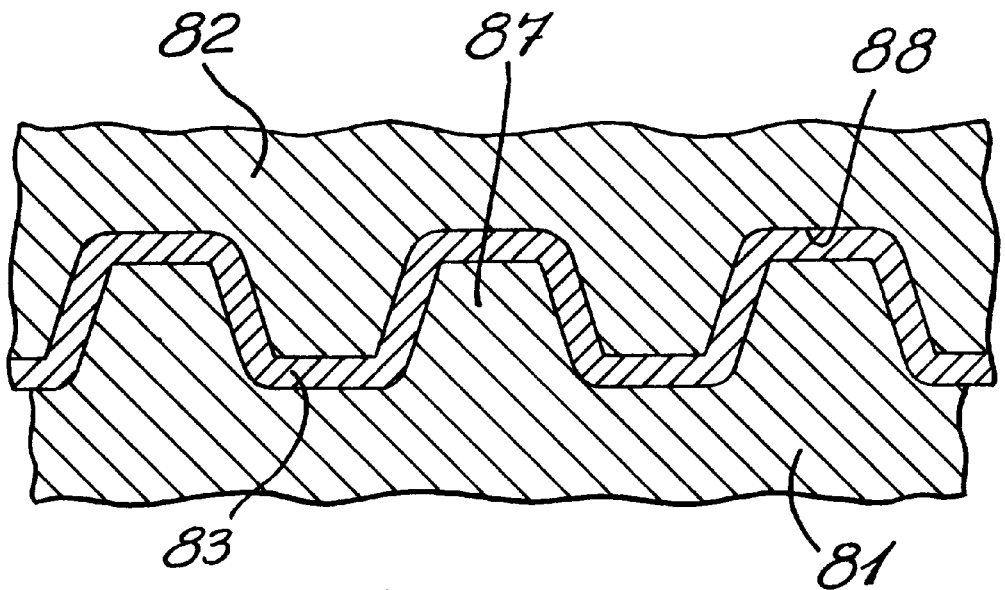
FIG. 2 shows a partial cross sectional view of the first and second containment rings intermeshing in response to a blade burst.

The system of the present invention operates as follows: A gas turbine engine is designed to include turbine blades which fail before any mechanical failure of the blade hub. This can be accomplished by designing each blade to include a slight nick or weakness along its length. In the event of a blade fracture or blade burst, the turbine blades from the blade section 20 are expelled radially outwardly against the inner surface of the first inner ring 81. The kinetic energy of the blade translates into a deformation of the inner ring 81 relative to the outer ring 82. The ductile sheet of material 83 absorbs this transfer of energy and is either bent or punctured by the deformation of the inner ring with respect to the outer ring, as shown in FIG. 2.

In the alternate embodiment of FIG. 3, the inner containment ring transfers the kinetic energy of the blade burst to the interference fitted protrusions 101 and recesses 102 on the respective inner and outer containment rings 81, 82. Since a high level of energy must be expended to move the protrusions relative to the recesses in an interference fit, the energy of the blade burst is absorbed by the movement of the protrusions 101 into the respective recesses 102.

While the outer ring 82 is also capable of absorbing the transfer of energy from a blade fracture or blade burst, the outer ring 82 is formed from a less ductile material than the material used to form the inner containment ring 81. The outer ring 82 will thus remain substantially in place while permitting the inner ring 81 to absorb most of the energy released during a blade burst condition. Such a design permits the engine to remain intact during a failure of one or more the blades 20, while simultaneously absorbing the sudden transfer of energy from loose or broken blades against the inner wall of the engine housing.

This system also affords a lightweight construction, in comparison to the more conventional, solid one piece containment systems known in the prior art. The containment rings of the present invention are also relatively easy to manufacture, as they are formed from only three fundamental parts, namely, the inner containment ring 81, the outer containment ring 82 and the ductile sheet of material 83 sandwiched between the inner and outer rings.

The containment shroud system may also be applied to other engine sections as well, including, but not limited to the air compression section, or any other section of a gas turbine engine which contains a set of rotating rotor blades. The present invention is also not limited to applications in gas turbine engines, but may be utilized in any type of system which incorporates a set of rotating blades, or other types of systems known to one of ordinary skill in the art where it is desirable to contain a blade failure.

Having shown and described the preferred embodiment of the present invention, further adaptations of the containment system can be accomplished by appropriate modifications by one of ordinary skill in the art without departing from the scope of the invention. For example, the containment system may be formed as a multiple layer system.

We claim:

1. A containment system for containing blades or fragments of blades resulting from a blade failure within an engine housing, comprising:

a first inner circumferential containment means;

a second outer circumferential containment means surrounding said first inner circumferential containment means;

a circumferential sheet of ductile material between said first inner circumferential containment means and said second outer circumferential containment means; and mounting means for mounting said first inner and second outer circumferential containment means in a closely spaced relationship each with a respective complementary surface, a first of said complementary surfaces including a plurality of convex protrusions, and a second of said complementary surfaces including a plurality of concave protrusions.

2. The containment system as claimed in claim 1, wherein said convex protrusions are ribs and said concave protrusions are grooves.

3. The containment system as claimed in claim 2, wherein said ribs and grooves are tapered.

4. The containment system as claimed in claim 1, wherein said ductile sheet material is spaced between said first complementary surface and said second complementary surface.

5. The containment system as claimed in claim 1, wherein said ductile sheet material is a relatively thin sheet of metal.

6. The containment system as claimed in claim 1, wherein said ductile sheet material has a thickness of about 30 mils.

7. The containment system as claimed in claim 1, wherein said ductile sheet material has a thickness of about 40 mils.

8. The containment system as claimed in claim 1, wherein said first circumferential containment means is formed from a material with a higher ductility than said second containment means.

9. The containment system as claimed in claim 1, wherein said mounting means comprises a plurality of legs.

10. The containment system as claimed in claim 9, wherein said first and second circumferential containment means are integrally mounted to said legs.

11. The containment system as claimed in claim 9, wherein said legs are fixedly mounted to a housing, radially outward of said blades.

12. The containment system as claimed in claim 11, wherein said legs are fixedly mounted to said housing by fasteners.

13. The containment system as claimed in claim 1 in combination with a turbine engine system including a compressor section, a turbine section and an exhaust section, wherein said first and second containment means circumferentially surround one of said compressor section and turbine section.

14. The containment system as claimed in claim 13, wherein said first and second containment means are concentrically aligned with one of said compressor section and turbine section.

15. The containment system of claim 13, wherein said turbine engine is a gas turbine engine.

16. The containment system of claim 13, wherein said turbine engine is a turboprop engine.

17. The containment system of claim 13, wherein said turbine engine forms part of an auxiliary power unit.

18. The containment system of claim 13, wherein said turbine engine is a jet engine.

19. The containment system of claim 1, wherein said first inner circumferential containment means and said second outer circumferential containment means are rings.

20. A containment system for containing blades or fragments of blades resulting from a blade failure within an engine housing, comprising:

a first inner circumferential containment means;

a second outer circumferential containment means surrounding said first inner circumferential containment means;

a set of convex protrusions on one of said first inner circumferential containment means and second outer circumferential containment means;

a set of concave protrusions on the other of said first inner circumferential containment means and second outer circumferential containment means;

wherein said convex protrusions and concave recesses intermesh with an interference fit.

21. The containment system of claim 20, wherein said convex protrusions have a substantially different cross sectional shape than a cross sectional shape of the convex recesses.

22. The containment system of claim 21, wherein one of said cross sectional shapes is substantially trapezoidal and another of said cross sectional shapes is rectangular.

23. The containment system of claim 20, wherein said convex protrusions have a cross sectional shape which is complementary to a cross sectional shape of said convex recesses.

24. The containment system of claim 2, wherein said ribs and said grooves extend circumferentially of said complementary inner surfaces.

\* \* \* \* \*